(12) United States Patent
Raffy et al.

(10) Patent No.: US 12,469,189 B1
(45) Date of Patent: Nov. 11, 2025

(54) ARTIFICIAL INTELLIGENCE SYSTEM INCLUDING THREE-DIMENSIONAL LABELING USING FRAME OF REFERENCE PROJECTIONS

(71) Applicant: Change Healthcare Holdings LLC, Nashville, TN (US)

(72) Inventors: Philippe Raffy, Edina, MN (US); Jean-Francois Pambrun, La Prairie (CA); David Dubois, Mirabel (CA); Ashish Kumar, Danville, CA (US)

(73) Assignee: Change Healthcare Holdings, LLC, Nashville, TN (US)

( * ) Notice: Subject to any disclaimer, the term of this patent is extended or adjusted under 35 U.S.C. 154(b) by 115 days.

(21) Appl. No.: 17/150,438

(22) Filed: Jan. 15, 2021

(51) Int. Cl.
- *G06T 11/00* (2006.01)
- *G06F 21/62* (2013.01)
- *G06T 5/40* (2006.01)
- *G16H 30/40* (2018.01)

(52) U.S. Cl.
CPC ........ *G06T 11/003* (2013.01); *G06F 21/6245* (2013.01); *G06T 5/40* (2013.01); *G16H 30/40* (2018.01); *G06T 2210/12* (2013.01)

(58) Field of Classification Search
CPC ..... G06T 11/003; G06T 5/40; G06T 2210/12; G06T 2207/10; G06T 2207/10072; G06T 2207/10081; G06T 2207/10088; G16H 30/40; G06F 21/6245; G06K 2209/00; G06K 2209/05; G06K 9/20; G06K 9/32; G06K 9/3233; G06K 9/3241; G06K 9/62; G06K 9/6217; G06K 9/6256; G06K 9/6259; G06K 9/6267; G06K 9/6279; G06K 9/628; G06K 9/6288; G06K 9/6292; G06N 3/0454; G06N 3/08; G06N 3/084

See application file for complete search history.

(56) References Cited

U.S. PATENT DOCUMENTS

| | | | | |
|---|---|---|---|---|
| 5,881,969 | A * | 3/1999 | Miller | F41G 7/2293 244/3.17 |
| 6,317,509 | B1 * | 11/2001 | Simanovsky | G01V 5/226 250/363.04 |
| 12,138,013 | B2 * | 11/2024 | Saphier | A61B 5/7475 |
| 2010/0272341 | A1 * | 10/2010 | Reeves | G06T 7/0012 382/131 |
| 2012/0299911 | A1 * | 11/2012 | Tytgat | G06T 7/593 345/419 |
| 2015/0173715 | A1 * | 6/2015 | Poston et al. | A61B 8/46 600/440 |

(Continued)

FOREIGN PATENT DOCUMENTS

WO  WO-2021/001564 A1 *  1/2021 .......... G06T 7/0014

*Primary Examiner* — Gandhi Thirugnanam
(74) *Attorney, Agent, or Firm* — MARSHALL, GERSTEIN & BORUN LLP

(57) ABSTRACT

A method includes receiving a plurality of images, each of the plurality of images being a two-dimensional view of a portion of a three-dimensional object; receiving a definition of a three-dimensional volume in a same frame of reference as the plurality of images; receiving a label for the three-dimensional volume; projecting the three-dimensional volume onto each of the plurality of images; determining, for each of the plurality of images an image metric; and determining whether to assign the label to respective ones of the plurality of images based on the image metric.

18 Claims, 8 Drawing Sheets

(56) References Cited

U.S. PATENT DOCUMENTS

| | | | |
|---|---|---|---|
| 2017/0061376 A1* | 3/2017 | Wagner et al. | G06Q 10/08345 |
| | | | 705/335 |
| 2020/0134427 A1* | 4/2020 | Jang et al. | G06N 3/0454 |
| | | | 706/25 |
| 2020/0160982 A1* | 5/2020 | Osman et al. | G16H 30/40 |
| | | | 705/2 |
| 2020/0200907 A1* | 6/2020 | Li | G01S 17/89 |
| 2021/0004566 A1* | 1/2021 | Qi | G06V 10/82 |
| 2021/0004635 A1* | 1/2021 | Guo | G06V 10/811 |
| 2021/0321872 A1* | 10/2021 | Saphier | G06V 20/64 |
| 2022/0012939 A1* | 1/2022 | Wang | G06V 20/64 |
| 2022/0101048 A1* | 3/2022 | Tan | G16H 50/20 |
| 2022/0157049 A1* | 5/2022 | Inoshita | G06T 15/503 |
| 2022/0165034 A1* | 5/2022 | Zhou | G06V 20/64 |
| 2022/0262100 A1* | 8/2022 | Chandler | G06V 10/774 |
| 2023/0133026 A1* | 5/2023 | Wang | H04N 13/296 |
| | | | 345/419 |
| 2023/0281842 A1* | 9/2023 | Ribeiro | G06V 10/26 |
| | | | 382/132 |
| 2023/0342902 A1* | 10/2023 | Manafiazar | G06V 10/82 |

* cited by examiner

ARTIFICIAL INTELLIGENCE SYSTEM INCLUDING THREE-DIMENSIONAL LABELING USING FRAME OF REFERENCE PROJECTIONS

FIELD

The present inventive concepts relate generally to health care systems and services and, more particularly, to labeling of data to train Artificial Intelligence (AI) systems.

BACKGROUND

Artificial Intelligence (AI) systems may be designed to emulate the problem solving skills of the human brain. AI systems may be trained by providing them with large amounts of data. There are generally two types of training approaches: supervised learning and unsupervised learning. In the supervised learning approach, humans transfer their knowledge to the dataset through the use of labels. By labeling the input data along with the possible outcomes the AI system can essentially learn over time as it sees more examples and makes corrections when it predicts or answers wrong. In the unsupervised learning approach, the data is unlabeled; therefore, there is no sample dataset with known answers by which the AI system can learn. Instead, the AI system looks for patterns in the data and attempts to correlate these patterns with things to predict or detect. In supervised learning, humans are typically presented with unlabeled data to annotate and this labeled data may be used to train and implement an AI engine, which implements an AI model. Thus, good quality labeled data may be the foundation of a supervised machine learning effort. Successful training relies on the quality and quantity of the training dataset. As a result, it is not uncommon to have datasets with millions of manually labeled images. Producing such labeled datasets is often meticulous and labor-intensive. This labeling could be at the image level (e.g., this image contains a cat), the region level (e.g., a cat is contained within this rectangle sub-region of the image), and/or the pixel level (e.g., this group of pixels represents a cat within this image).

SUMMARY

According to some embodiments of the inventive concept, a method comprises receiving a plurality of images, each of the plurality of images being a two-dimensional view of a portion of a three-dimensional object; receiving a definition of a three-dimensional volume in a same frame of reference as the plurality of images; receiving a label for the three-dimensional volume; projecting the three-dimensional volume onto each of the plurality of images; determining, for each of the plurality of images, an image metric; and determining whether to assign the label to respective ones of the plurality of images based on the image metric.

In other embodiments, the image metric is based on image surface area, a standard deviation of image pixel values, and/or a histogram of image pixel values.

In still other embodiments, the image metric is based on image surface area and the method further comprises assigning the label to respective ones of the plurality of images based on a first amount of surface area of the image that is contained within the three-dimensional volume and a second amount of surface area that is contained outside of the three-dimensional volume.

In still other embodiments, assigning the label to respective ones of the plurality of images comprises assigning the label to respective ones of the plurality of images when a percentage defined by a ratio of the first amount of surface area to a sum of the first amount of surface area and the second amount of surface area exceeds a surface area percentage threshold.

In still other embodiments, the method further comprises training a machine learning engine using the ones of the plurality of images having the label assigned thereto.

In still other embodiments, the method further comprises generating an artificial intelligence engine based on the machine learning engine that has been trained.

In still other embodiments, the plurality of images is associated with a regulatory constraint of a governmental administrative authority.

In still other embodiments, the plurality of images comprises Protected Health Information (PHI). The regulatory constraint comprises the Health Insurance Portability and Accountability Act (HIPAA).

In still other embodiments, receiving the definition of the three-dimensional volume comprises receiving a first two-dimensional bounding box in the same frame of reference as the plurality of images; receiving a second two-dimensional bounding box in the same frame of reference as the plurality of images; and defining the three-dimensional volume in the same frame of reference as the plurality of images based on the first two-dimensional bounding box and the second two-dimensional bounding box.

According to some embodiments of the inventive concept, a system comprises a processor and a memory coupled to the processor and comprising computer readable program code embodied in the memory that is executable by the processor to perform operations comprising receiving a plurality of images, each of the plurality of images being a two-dimensional view of a portion of a three-dimensional object; receiving a definition of a three-dimensional volume in a same frame of reference as the plurality of images; receiving a label for the three-dimensional volume; projecting the three-dimensional volume onto each of the plurality of images; determining, for each of the plurality of images, an image metric; and determining whether to assign the label to respective ones of the plurality of images based on the image metric.

In further embodiments, the image metric is based on image surface area, a standard deviation of image pixel values, and/or a histogram of image pixel values.

In still further embodiments, the image metric is based on image surface area and the method further comprises assigning the label to respective ones of the plurality of images based on a first amount of surface area of the image that is contained within the three-dimensional volume and a second amount of surface area that is contained outside of the three-dimensional volume In still further embodiments, assigning the label to respective ones of the plurality of images comprises assigning the label to respective ones of the plurality of images when a percentage defined by a ratio of the first amount of surface area to a sum of the first amount of surface area and the second amount of surface area exceeds a surface area percentage threshold.

In still further embodiments, the operations further comprise training a machine learning engine using the ones of the plurality of images having the label assigned thereto.

In still further embodiments, the operations further comprise generating an artificial intelligence engine based on the machine learning engine that has been trained.

In still further embodiments, the plurality of images is associated with a regulatory constraint of a governmental administrative authority.

In still further embodiments, the plurality of images comprises Protected Health Information (PHI). The regulatory constraint comprises the Health Insurance Portability and Accountability Act (HIPAA).

In still further embodiments, receiving the definition of the three-dimensional volume comprises receiving a first two-dimensional bounding box in the same frame of reference as the plurality of images; receiving a second two-dimensional bounding box in the same frame of reference as the plurality of images; and defining the three-dimensional volume in the same frame of reference as the plurality of images based on the first two-dimensional bounding box and the second two-dimensional bounding box.

In some embodiments of the inventive concept, a computer program product comprises a non-transitory computer readable storage medium comprising computer readable program code embodied in the medium that is executable by a processor to perform operations comprising receiving a plurality of images, each of the plurality of images being a two-dimensional view of a portion of a three-dimensional object; receiving a definition of a three-dimensional volume in a same frame of reference as the plurality of images; receiving a label for the three-dimensional volume; projecting the three-dimensional volume onto each of the plurality of images; determining, for each of the plurality of images, an image metric; and determining whether to assign the label to respective ones of the plurality of images based on the image metric.

In other embodiments, the image metric is based on image surface area, a standard deviation of image pixel values, and/or a histogram of image pixel values.

Other methods, systems, articles of manufacture, and/or computer program products according to embodiments of the inventive concept will be or become apparent to one with skill in the art upon review of the following drawings and detailed description. It is intended that all such additional systems, methods, articles of manufacture, and/or computer program products be included within this description, be within the scope of the present inventive subject matter, and be protected by the accompanying claims.

BRIEF DESCRIPTION OF THE DRAWINGS

Other features of embodiments will be more readily understood from the following detailed description of specific embodiments thereof when read in conjunction with the accompanying drawings, in which.

DETAILED DESCRIPTION

Figure 1:
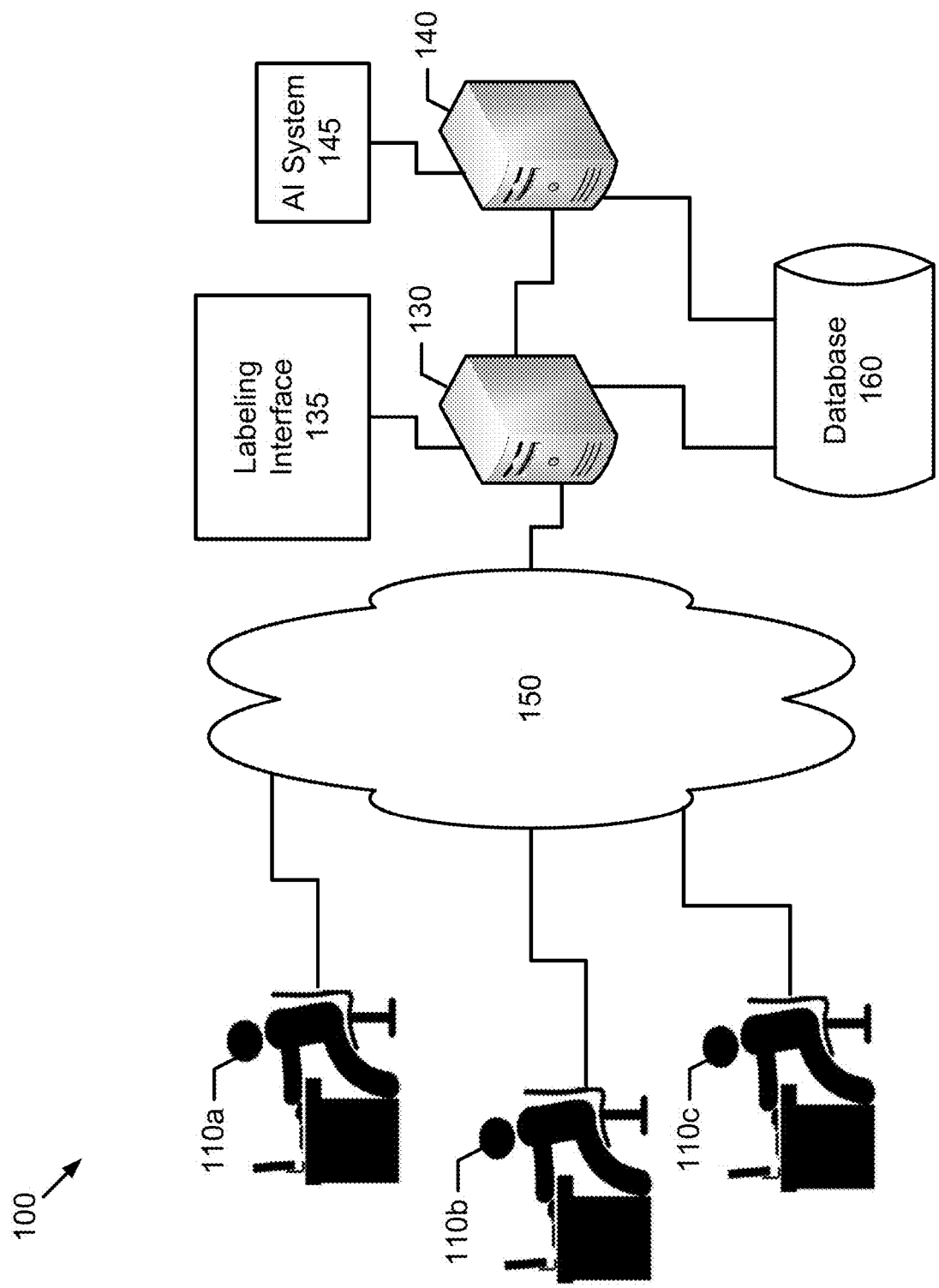
FIG. 1 is a block diagram that illustrates a communication network including an Artificial Intelligence (AI) system with a three-dimensional labeling capability using frame of reference projections in accordance with some embodiments of the inventive concept.

In the following detailed description, numerous specific details are set forth to provide a thorough understanding of embodiments of the present inventive concept. However, it will be understood by those skilled in the art that the present invention may be practiced without these specific details. In some instances, well-known methods, procedures, components and circuits have not been described in detail so as not to obscure the present inventive concept. It is intended that all embodiments disclosed herein can be implemented separately or combined in any way and/or combination. Aspects described with respect to one embodiment may be incorporated in different embodiments although not specifically described relative thereto. That is, all embodiments and/or features of any embodiments can be combined in any way and/or combination.

Embodiments of the inventive concept are described herein in the context of a prediction engine that includes a machine learning engine and an artificial intelligence (AI) engine. It will be understood that embodiments of the inventive concept are not limited to a machine learning implementation of the prediction engine and other types of AI systems may be used including, but not limited to, a multi-layer neural network, a deep learning system, a natural language processing system, and/or computer vision system Moreover, it will be understood that the multi-layer neural network is a multi-layer artificial neural network comprising artificial neurons or nodes and does not include a biological neural network comprising real biological neurons.

Some embodiments of the inventive concept stem from a realization that when labeling images in a dataset to train an AI system, many of the images may be related to the same item. For example, in medical imaging, many of the images of a magnetic resonance imaging (MRI) or computed tomography (CT) scan represent slices of the same three-dimensional volume, such as a body part. Rather than label each image individually, some embodiments of the inventive concept may provide a labeling platform in which a three-dimensional volume can be defined in the same frame of reference as a plurality of two-dimensional images. In the context of a medical application, the images may be two dimensional images of a patient's body part. The three-dimensional volume may encompass images of the body part from multiple perspectives and may be assigned a label, such as the name of the body part. The three-dimensional volume may then be projected onto the respective ones of the plurality of two-dimensional images. An image metric may be determined for two-dimensional images. For example, the amount of surface area of an image that falls inside the three-dimensional volume and the amount of surface area of the image that falls outside of the three-dimensional volume may be determined. When the amount of surface area of the image that falls inside the three-dimensional volume relative to a total surface area of the images exceeds a defined threshold, then the image may be considered part of the same three-dimensional object, e.g., body part image, that is encompassed by the three-dimensional volume and, therefore, labeled with the label assigned to the three-dimensional volume. For example, when the three-dimensional volume encompasses a patient's hand, then all the two-dimensional images showing slices of the patient's hand from different cross-sectional perspectives can be automatically labeled with the same label as the three-dimensional volume thereby avoiding the manual labeling process for numerous images. Image surface area is one image metric that can be used to determining whether to assign a label to a two-dimensional image. Other image metrics that may be used may include, but are not limited to a standard deviation of image pixel values, and/or a histogram of image pixel values.

Referring to FIG. 1, a communication network 100 including an AI system with a three-dimensional labeling capability using frame of reference projections, in accordance with some embodiments of the inventive concept, comprises labeling entities 110a, 110b, and 110c that may use devices, such as computers, laptops, tables, mobile communication devices (e.g., smart phones), and the like, to label records for use in training an AI system. The labeling entities 110a, 110b, and 110c may each represent a single person or may each represent multiple persons. For example, a labeling entity may be representative of a committee that works together in labeling records.

An AI system may provide an AI labeling platform through use of a labeling interface server 130, which is communicatively coupled to an AI system server 140. Both the labeling interface server 130 and the AI system server 140 are coupled to a database 160, which contains the records to be labeled. The labeling interface server 130 may include a labeling interface module 135 that is configured to securely present or provide records from the database to the labeling entities 110a, 110b, and 110c for labeling. In some embodiments of the inventive concept, the labeling interface module 135 may provide a secure Web application that is configured to implement any security protocols associated with restricting access to the records in the database. For example, the handling of certain types of data may be controlled by a regulatory constraint of a governmental administrative authority. One such example is PHI data, which are protected by the HIPAA act. Thus, the labeling interface module 135 may ensure that only those labelling entities 110a, 110b, and 110c that possess the proper security qualifications (e.g., security qualifications that comply with any governmental regulatory constraint or private security policy) are allowed to view and label the data contained in the records stored in the database 160. In addition to the labeling entities 110a, 110b, and 110c, the labeling interface module 135 may further protect the database 160 with an electronic security access wall to ensure that the database records 160 are not exposed to any entity that is not authorized to access or view the information contained therein.

In some embodiments the records in the database 160 may be images, such as, for example, images resulting from medical imaging applications. It will be understood, however, that embodiments of the inventive concept may be applied to other types of imaging applications including, but not limited to, manufacturing, construction, agriculture, security, or other applications where images may be labeled as three-dimensional objects or subjects. In medical imaging, for example, many of the images of a magnetic resonance imaging (MRI) or computed tomography (CT) scan may represent slices of the same three-dimensional volume, such as a body part. The labeling interface module 135 may present a plurality of two-dimensional images, which are in the same frame of reference, to one or more of the labeling entities 110a, 110b, and 110c. A labeling entity 110a, 110b, and 110c may define a three-dimensional volume by selecting two of the two-dimensional images and creating two-dimensional bounding boxes on the two-dimensional images, respectively. The two-dimensional bounding boxes may be in respective planes that intersect one another and can be used to define a three-dimensional volume based on their respective dimensions. The three-dimensional volume may then be assigned a label, which can be used to automatically label other images in the database 160 without the manual intervention or assistance of the labeling entities 110a, 110b, and 110c.

The images that are manually labeled by the labeling entities 110a, 110b, and 110c or automatically labeled by the labeling interface server 135 and/or the AI system server 140 may be used to train the AI system 145 running on the AI system server 140. It will be understood that the division of functionality described herein between the AI system server 140/AI system module 145 and the labeling interface server 130/labeling interface module 135 is an example. Various functionality and capabilities can be moved between the AI system server 140/AI system module 145 and the labeling interface server 130/labeling interface module 135 in accordance with different embodiments of the inventive concept. Moreover, in some embodiments, the AI system server 140/AI system module 145 and the labeling interface server 130/labeling interface module 135 may be merged as a single logical and/or physical entity.

A network 150 couples the labeling entities 110a, 110b, and 110c to the labeling interface server 130/labeling interface module 135. The network 150 may be a global network, such as the Internet or other publicly accessible network. Various elements of the network 150 may be interconnected by a wide area network, a local area network, an Intranet, and/or other private network, which may not be accessible by the general public. Thus, the communication network 150 may represent a combination of public and private networks or a virtual private network (VPN). The network 150 may be a wireless network, a wireline network, or may be a combination of both wireless and wireline networks.

The AI system with the three-dimensional labeling capability using frame of reference projections service provided through the AI system server 140/AI system module 145 and the labeling interface server 130/labeling interface module 135, in some embodiments, may be embodied as a cloud service. In some embodiments, the AI system and labeling service may be implemented as a Representational State Transfer Web Service (RESTful Web service).

Although FIG. 1 illustrates an example communication network including an AI system with a three-dimensional labeling capability using frame of reference projections, it will be understood that embodiments of the inventive subject matter are not limited to such configurations, but are intended to encompass any configuration capable of carrying out the operations described herein.

Figure 2:
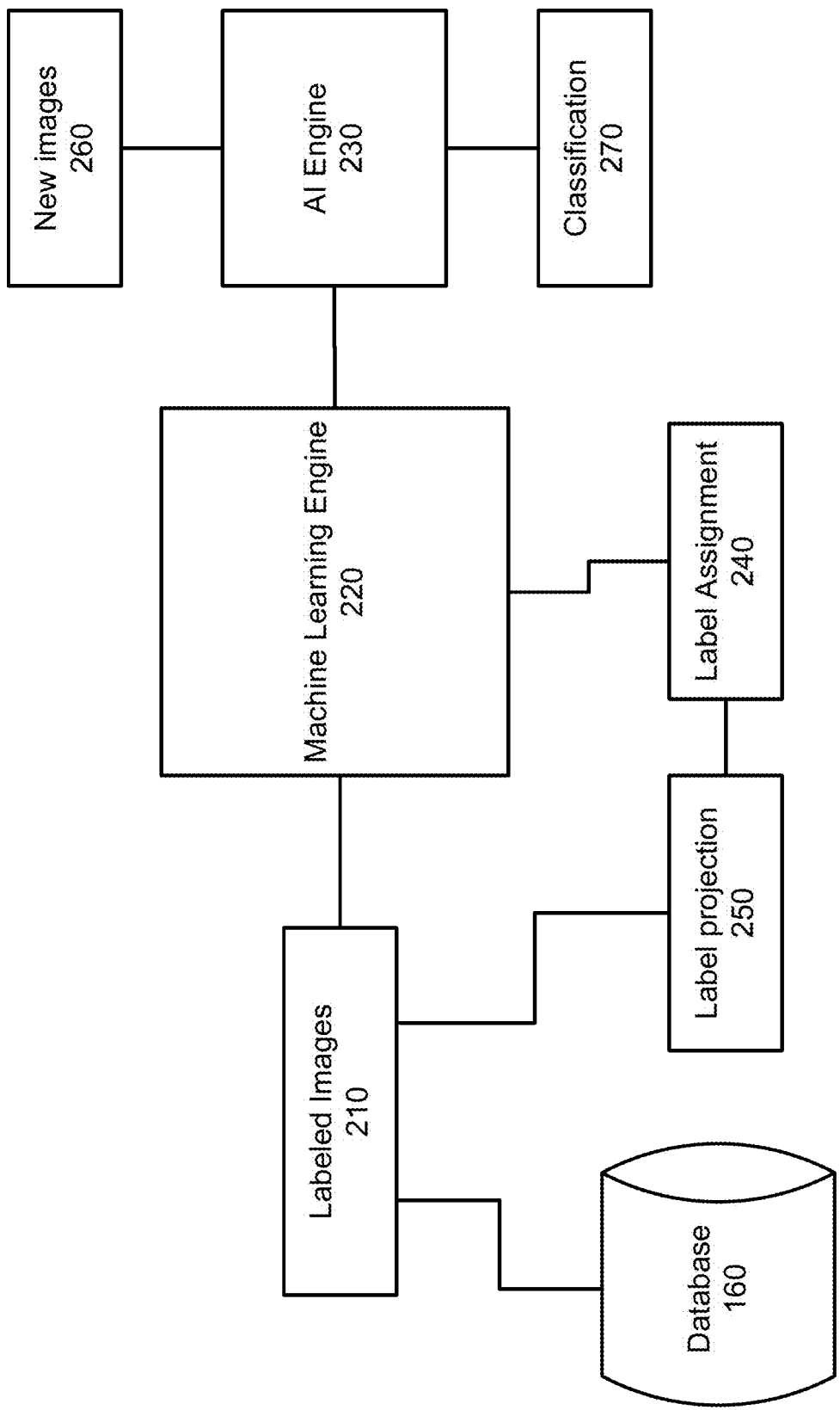
FIG. 2 is a block diagram of the AI system of FIG. 1 in accordance with some embodiments of the inventive concept.

FIG. 2 is a block diagram of the AI system of FIG. 1 in accordance with some embodiments of the inventive concept. As shown in FIG. 2, the AI system module 145 may comprise a machine learning engine 220 and an AI engine 230. The machine learning engine 220 may process records, i.e., labeled images 210 from the database 160 that include labels manually provided from the labeling entities 110a, 110b, and 110c along with labels automatically generated using the labeling interface server 130 and/or the AI system server 140. The labeled images 210 may include a three-dimensional volume that may be generated from a pair of two-dimensional bounding boxes drawn by the labeling entities 110a, 110b, and 110c. The labeling entities 110a, 110b, and 110c may assign a label to the three-dimensional volume, which can be used to automatically label other images in the database 160. Various types of image metrics may be used in determining whether to automatically label an image from the database 160. Such image metrics may include, but are not limited to, image surface area, a standard deviation of image pixel values, and/or a histogram of image pixel values. In some embodiments, the label projection module 250 may be configured to project the three-dimensional volume onto respective ones of the two-dimensional images contained in the database 160. Based on the projection, the amount of surface area of an image from the database 160 that falls inside the three-dimensional volume and the amount of surface are of the image that falls outside of the three-dimensional volume may be determined. The label assignment module 240 may automatically assign the label that was assigned to the three-dimensional volume to respective ones of the images from the database 160 having an amount of surface area that falls inside the three-dimensional volume relative to a total surface area of the image that exceeds a defined threshold. Thus, when a relatively high percentage of the surface area of an image falls within a three-dimensional volume of a labeled object or subject, for example, it can be assumed that the image corresponds the same object or subject encompassed by the three-dimensional volume and can, therefore, be automatically assigned the same label.

The machine learning engine 220 may aggregate labels for one or more objects or subjects in an image to obtain a consensus label for the object or subject. The image including the labeled object or subject may then be used as a training record that can be used to train the decision making used in the AI engine 230. The machine learning engine 220 may use modeling techniques to evaluate the effects of various input data (e.g., labeled objects or subjects contained in the images) on the generated outputs. These effects may then be used to tune and refine the quantitative relationship between the labeled images in the training records from the database 160 and the generated outputs. The tuned and refined quantitative relationship between the labeled images in the training records generated by the machine learning engine 220 is output for use in the AI engine 230. The machine learning engine 220 may be referred to as a machine learning algorithm. The AI engine 230 may, in effect, be generated by the machine learning engine 220 in the form of the quantitative relationship determined between the labeled images in the training records and the generated outputs (e.g., predictions, answers to questions, classification of images, etc.). The AI engine 230 may be referred to as an AI model.

The AI engine 230 may be used to process new images 260 from the database 160 or other source locations to classify the subject or objects contained therein based on the quantitative relationships generated during the training process described above. The classification module 270 may be configured to communicate the classification of an image to a user or other destination.

Figure 3:
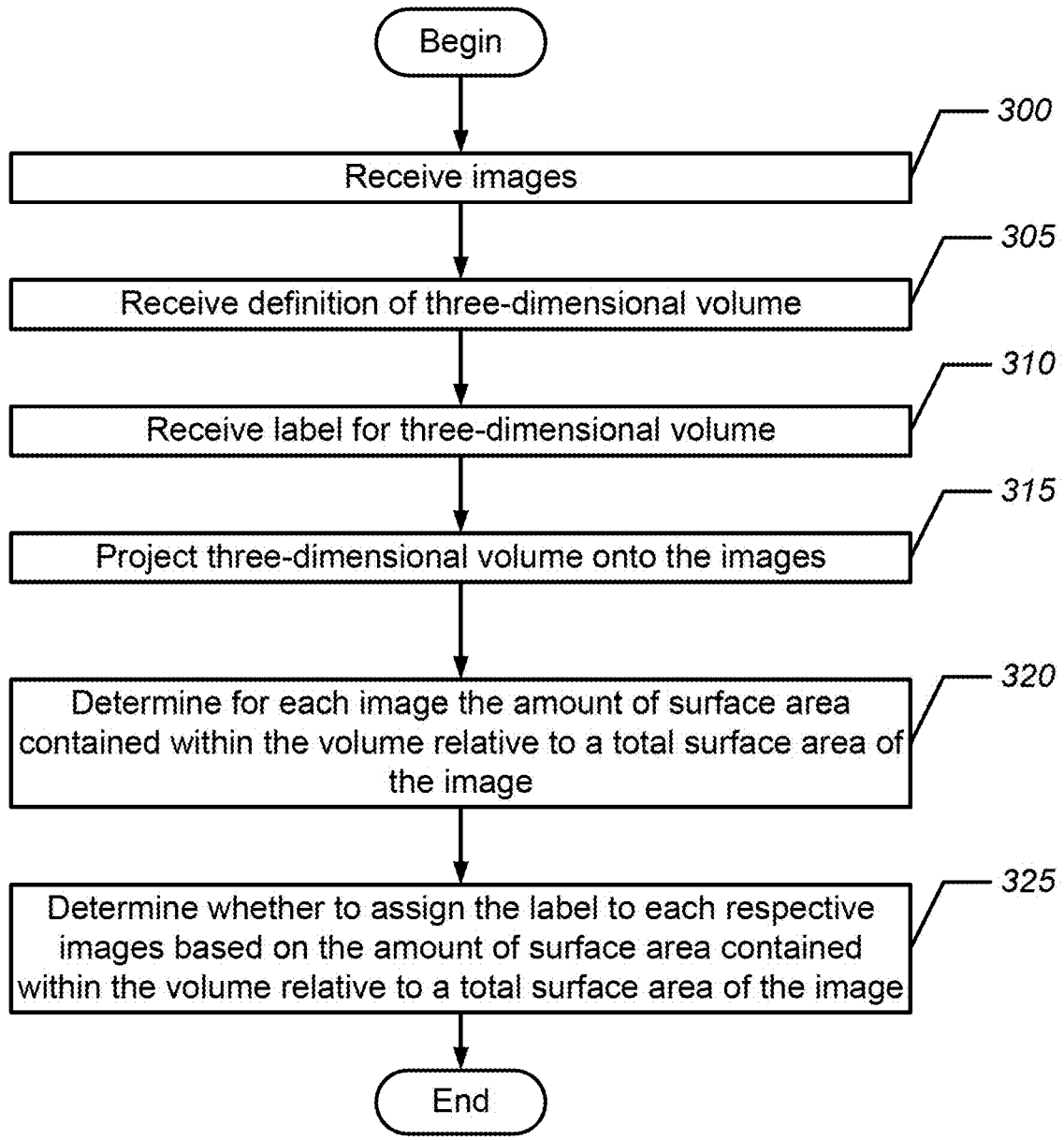
FIGS. 3 and 4 are flowcharts that illustrate operations of three-dimensional labeling using frame of reference projections in accordance with some embodiments of the inventive concept.
Figure 4:
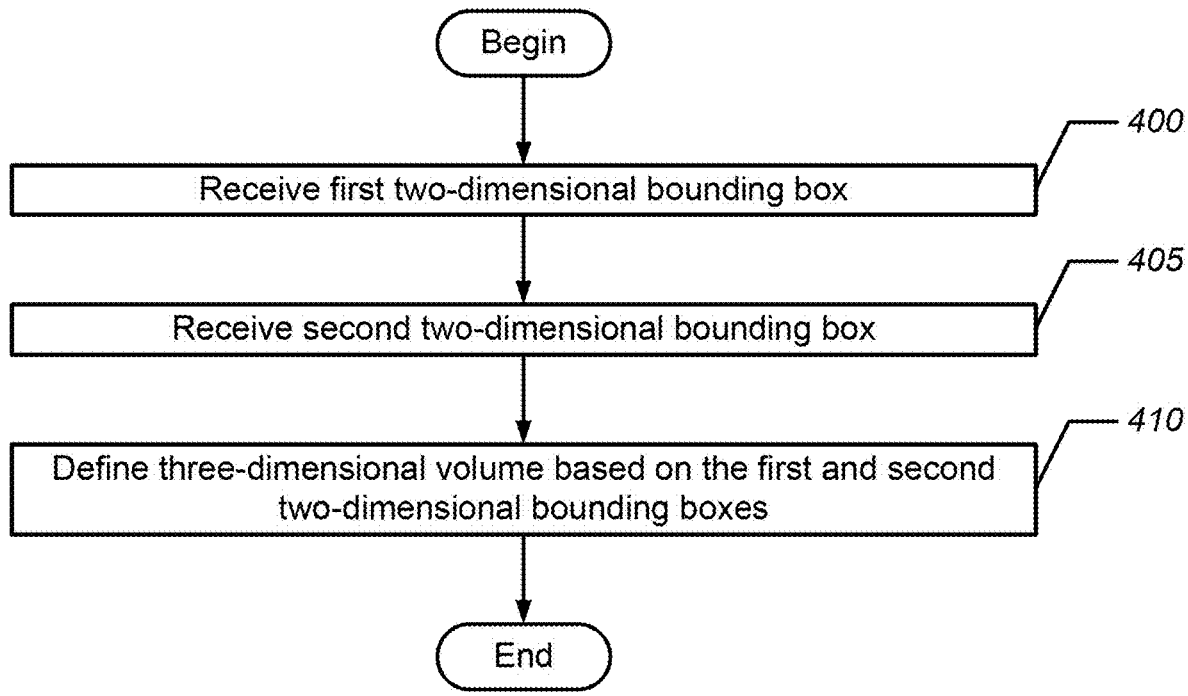

FIGS. 3 and 4 are flowcharts that illustrate operations of three-dimensional labeling using frame of reference projections in accordance with some embodiments of the inventive concept. Referring now to FIG. 3, operations begin at block 300 where the labeling interface module 135 receives a plurality of images from the database 160 for labeling by one or more of the labeling entities 110a, 110b, and 110c. A labeling entity 110a, 110b, and 110c may define a three-dimensional volume in the same frame of reference as the plurality of images, which may be received at block 305. In the context of a medical application, the images may be two dimensional images of a patient's body part and the three-dimensional volume may encompass the body part.

Figure 5:
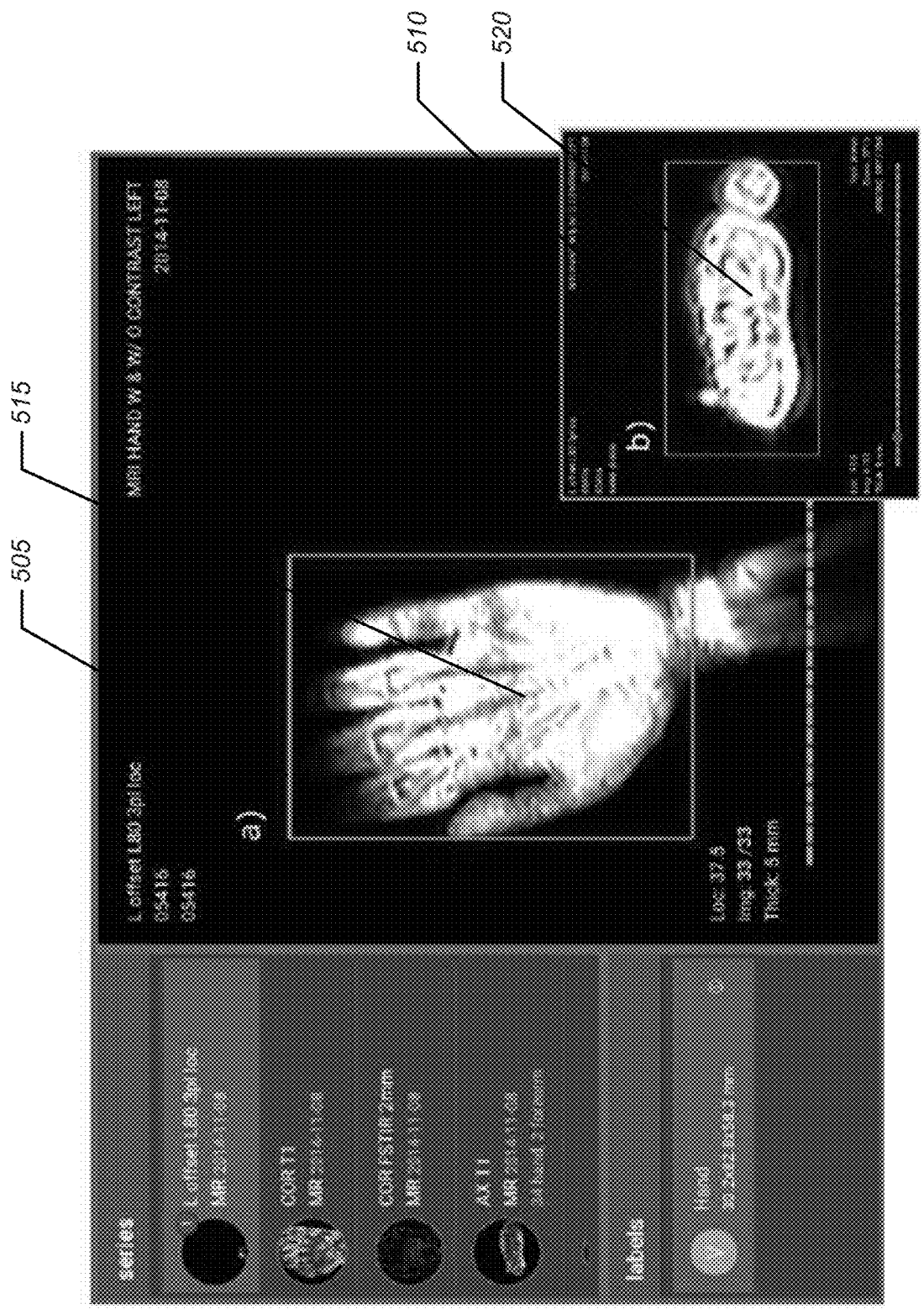
FIG. 5 is a diagram of an interface for drawing bounding boxes to define a three-dimensional volume for use in labeling in accordance with some embodiments of the inventive concept.

Referring to FIGS. 4 and 5, operations for defining the three-dimensional volume, according to some embodiments of the invention, begin at block 400, where as shown in FIG. 5, a labeling entity 110a, 110b, and 110c may define a three-dimensional volume by creating a first two-dimensional bounding box 505 on the two-dimensional image 515. At block 405, a labeling entity 110a, 110b, and 110c creates a second two-dimensional bounding box 510 on the two-dimensional image 520. Image 515 is a cross-sectional view from the perspective of a top of the patient's hand while image 520 is a cross-sectional view from the perspective of the patient's fingers and thumb pointing at the camera. The two-dimensional bounding boxes 505 and 510 are in respective planes that intersect one another and can be used to define a three-dimensional volume based on their respective dimensions at block 410.

Figure 7:
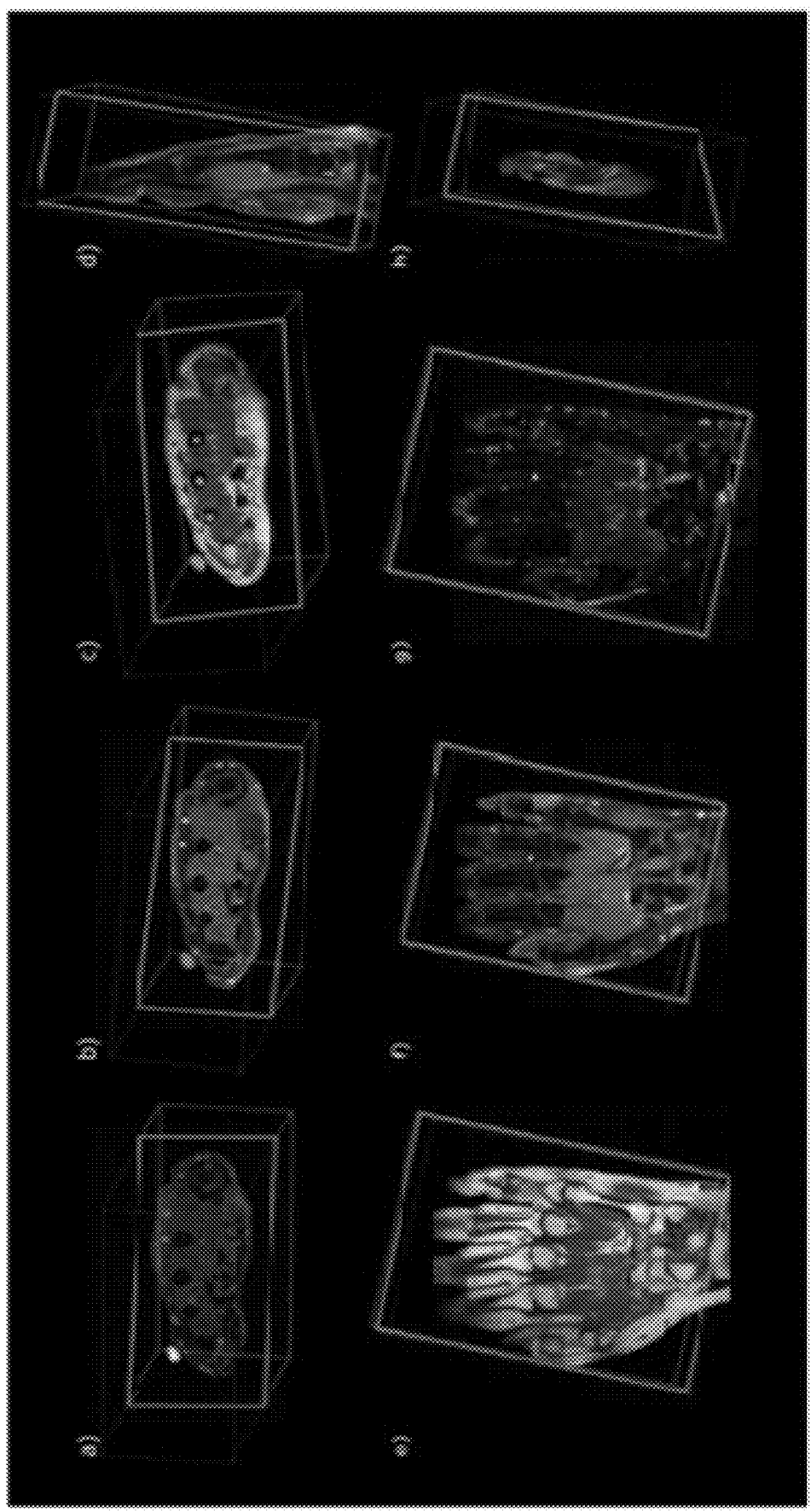
FIG. 7 is a diagram that illustrates projections of a three-dimensional volume onto two-dimensional images in accordance with some embodiments of the inventive concept.

Returning to FIG. 3, a labeling entity 110a, 110b, and 110c may assign the three-dimensional volume a label, which may be received at block 310. The three-dimensional volume may be projected onto the respective ones of the plurality of two-dimensional images from the database 160 at block 315. This projection is illustrated, for example, in FIG. 7, which highlights with thicker lines boundaries of a defined three-dimensional box that are projected onto a sequence of two-dimensional images for eight different images showing various perspective views of a patient's hand. A determination is made at block 320 of the amount of surface area of the two-dimensional image that falls inside the three-dimensional volume relative to a total amount of surface area of the two-dimensional training image. A determination is then made at block 325 whether to assign the label corresponding to the three-dimensional volume to respective ones of the images from the database 160 based on the amount of surface area contained within the volume relative to the total surface area of the image.

Figure 6:
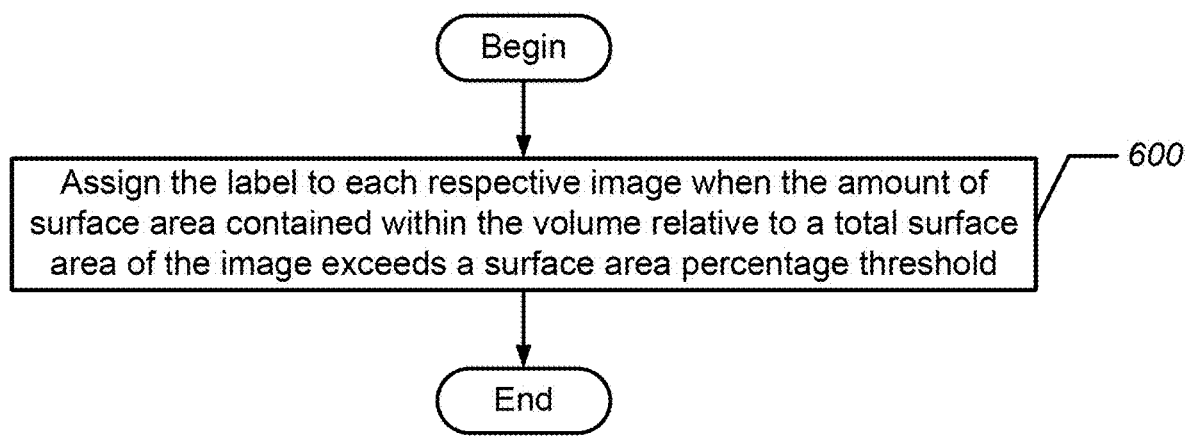
FIG. 6 is a flowchart that illustrates further operations of three-dimensional labeling using frame of reference projections in accordance with some embodiments of the inventive concept.

Referring now to FIG. 6, in some embodiments, the label assigned to the three-dimensional volume may be assigned to one of the images from the database 160 when the amount of surface area contained within the three-dimensional volume relative to a total surface area of the image exceeds a surface area percentage threshold at block 600. For example, when the three-dimensional volume encompasses images of a patient's hand, then all the two-dimensional images showing slices of the patient's hand from different cross-sectional perspectives using the same frame of reference can be automatically labeled with the same label as the three-dimensional volume thereby avoiding the manual labeling process for numerous images. The surface area percentage threshold can be adjusted based on accuracy/error rates, the types of subject or objects being labeled, or other factors.

FIGS. 3 and 6 illustrate example embodiments of the inventive concept in which image surface area is used as an image metric used in assigning a label to a two-dimensional image. Other image metrics may be used in place or in addition to the image surface area metric. These image metrics may include, but are not limited to, standard deviation of image pixel values and/or a histogram of image pixel values. A number and/or intensity of pixel values of an image that fall within a three-dimensional volume may be used to determine whether to assign a label to the image. The number and/or intensity of the pixel values may be compared to a threshold to determine whether the label should be assigned. A histogram of pixel values for image that show the distribution of pixels falling inside and outside of a three-dimensional volume may also be used to determine whether to assign a label to the image.

Figure 8:
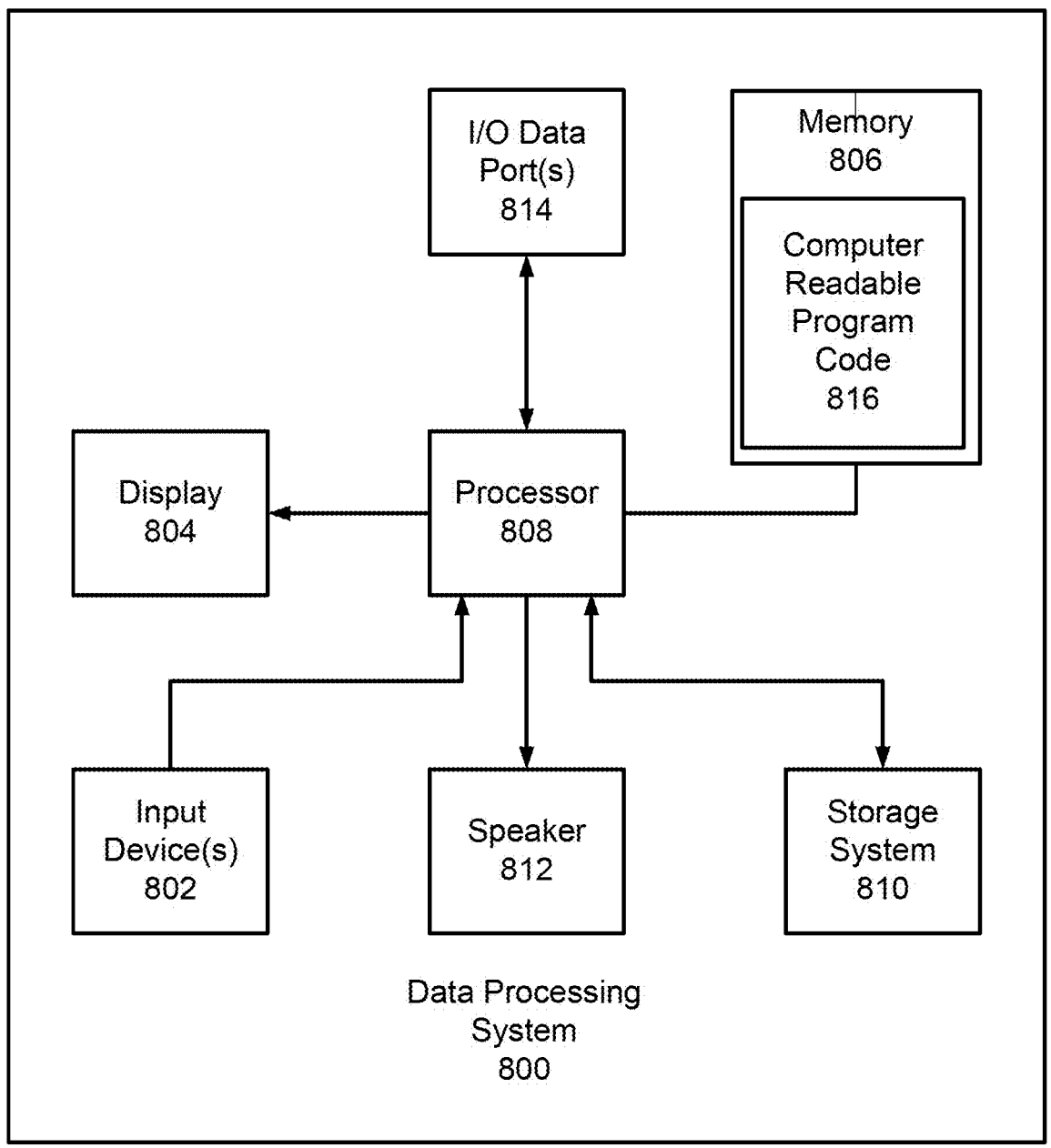
FIG. 8 is a data processing system that may be used to implement one or more servers in the AI system of FIG. 1 in accordance with some embodiments of the inventive concept.

Referring now to FIG. 8, a data processing system 800 that may be used to implement the labeling interface server 130 and/or AI system server of FIG. 1, in accordance with some embodiments of the inventive concept, comprises input device(s) 802, such as a keyboard or keypad, a display 804, and a memory 806 that communicate with a processor 808. The data processing system 800 may further include a storage system 810, a speaker 812, and an input/output (I/O) data port(s) 814 that also communicate with the processor 808. The processor 808 may be, for example, a commercially available or custom microprocessor. The storage system 810 may include removable and/or fixed media, such as floppy disks, ZIP drives, hard disks, or the like, as well as virtual storage, such as a RAMDISK. The I/O data port(s) 814 may be used to transfer information between the data processing system 900 and another computer system or a network (e.g., the Internet). These components may be conventional components, such as those used in many conventional computing devices, and their functionality, with respect to conventional operations, is generally known to those skilled in the art. The memory 806 may be configured with computer readable program code 816 to facilitate three-dimensional labeling using frame of reference projections according to some embodiments of the inventive concept.

Figure 9:
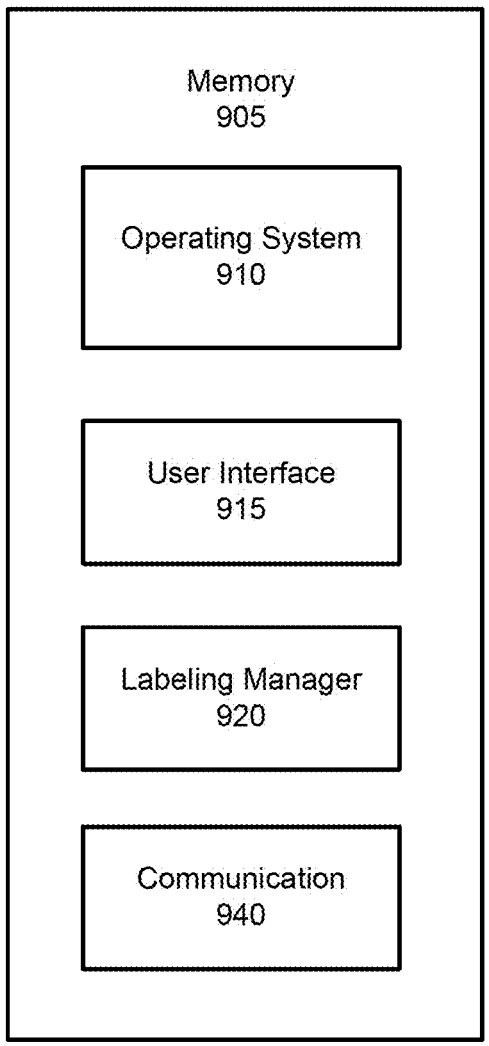
FIG. 9 illustrates an example memory that may be used in embodiments of data processing systems, such as the labeling interface server of FIG. 1 and the data processing system of FIG. 8, to facilitate three-dimensional labelling using frame of reference projections.

FIG. 9 illustrates a memory 905 that may be used in embodiments of data processing systems, such as the labeling interface server 130 of FIG. 1 and the data processing system 800 of FIG. 8, respectively, to facilitate three-dimensional labelling using frame of reference projections according to some embodiments of the inventive concept. The memory 905 is representative of the one or more memory devices containing the software and data used for facilitating operations of the labeling interface server 130 and the labeling interface module 135 as described herein. The memory 905 may include, but is not limited to, the following types of devices: cache, ROM, PROM, EPROM, EEPROM, flash, SRAM, and DRAM. As shown in FIG. 9, the memory 905 may contain four or more categories of software and/or data: an operating system 910, a user interface module 915, a labeling manager module 920, and a communication module 940. In particular, the operating system 910 may manage the data processing system's software and/or hardware resources and may coordinate execution of programs by the processor. The user interface module 915 may be configured to perform one or more of the operations described above with respect to the labeling interface server 130, the labeling interface module 135, the flowcharts of FIGS. 3, 4, and 6, and the diagrams of FIGS. 5 and 7. The labeling manager module 920 may be configured to perform one or more of the operations described above with respect to the labeling interface server 130, the labeling interface module 135, the flowcharts of FIGS. 3, 4, and 6, and the diagrams of FIGS. 5 and 7. The communication module 940 may be configured to support communication between, for example, the labeling interface server 130, the AI system server 140, the labeling entities 110a, 110b, and 110c, and/or the database 160.

Figure 10:
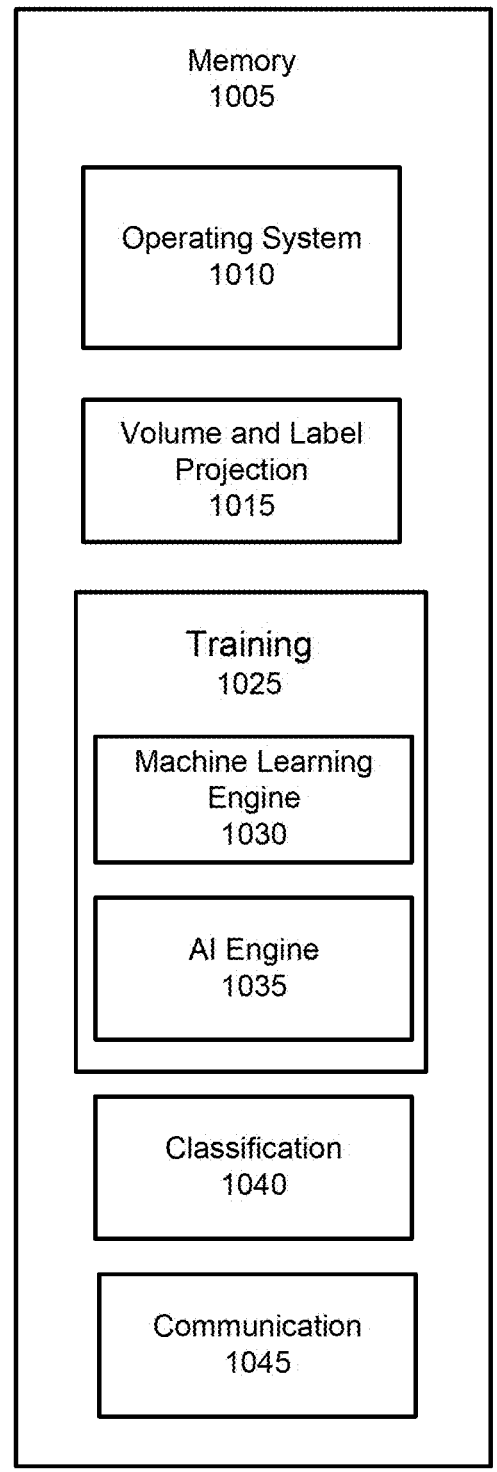
FIG. 10 illustrates an example memory that may be used in embodiments of data processing systems, such as the AI system server of FIG. 1 and the data processing system of FIG. 9, to facilitate three-dimensional labeling using frame of reference projections.

FIG. 10 illustrates a memory 1005 that may be used in embodiments of data processing systems, such as the AI system server 140 of FIG. 1 and the data processing system 900 of FIG. 9, respectively, to facilitate three-dimensional labeling using frame of reference projections according to some embodiments of the inventive concept. The memory 1005 is representative of the one or more memory devices containing the software and data used for facilitating operations of the AI system server 140 and the AI system module 145 as described herein. The memory 1005 may include, but is not limited to, the following types of devices: cache, ROM, PROM, EPROM, EEPROM, flash, SRAM, and DRAM. As shown in FIG. 10, the memory 1005 may contain five or more categories of software and/or data: an operating system 1010, a volume and label projection module 1015, a training module 1025, which includes a machine learning engine module 1030 and an AI engine module 1035, a classification module 1040, and a communication module 1045. In particular, the operating system 1010 may manage the data processing system's software and/or hardware resources and may coordinate execution of programs by the processor. The volume and label projection module 1015 may be configured to perform one or more of the operations described above with respect to the AI server 140, the machine learning engine 220, the label projection module 250, the label assignment module 240, the flowcharts of FIGS. 3, 4, and 6, and the diagrams of FIGS. 5 and 7. The machine learning engine module 1030 may be configured to perform one or more of the operations described above with respect to the AI server 140, the machine learning engine 220, the flowcharts of FIGS. 3, 4, and 6, and the diagrams of FIGS. 5 and 7. The AI engine module 1035 may be configured to perform one or more of the operations described above with respect to the AI server 140, the AI engine 230, the flowcharts of FIGS. 3, 4, and 6, and the diagrams of FIGS. 5 and 7. The classification module 1040 may be configured to perform one or more of the operations described above with respect to the AI server 140, the machine learning engine 220, AI engine 230, the classification module 270, the flowcharts of FIGS. 3, 4, and 6, and the diagrams of FIGS. 5 and 7. The communication module 1045 may be configured to support communication between, for example, the AI system server 140 and the labeling interface server 130 and/or the database 160.

Although FIGS. 9 and 10 illustrate hardware/software architectures that may be used in data processing systems, such as the labeling interface server 130 of FIG. 1, the AI engine server 140 of FIG. 1, and the data processing system 800 of FIG. 8, respectively, in accordance with some embodiments of the inventive concept, it will be understood that embodiments of the present invention are not limited to such a configuration but are intended to encompass any configuration capable of carrying out operations described herein.

Computer program code for carrying out operations of data processing systems discussed above with respect to FIGS. 1-10 may be written in a high-level programming language, such as Python, Java, C, and/or C++, for development convenience. In addition, computer program code for carrying out operations of the present invention may also be written in other programming languages, such as, but not limited to, interpreted languages. Some modules or routines may be written in assembly language or even micro-code to enhance performance and/or memory usage. It will be further appreciated that the functionality of any or all of the program modules may also be implemented using discrete hardware components, one or more application specific integrated circuits (ASICs), or a programmed digital signal processor or microcontroller.

Moreover, the functionality of the labeling interface server 130 of FIG. 1, the AI engine server 140 of FIG. 1, and the data processing system 800 of FIG. 8 may each be implemented as a single processor system, a multi-processor system, a multi-core processor system, or even a network of stand-alone computer systems, in accordance with various embodiments of the inventive concept. Each of these processor/computer systems may be referred to as a "processor" or "data processing system."

The data processing apparatus described herein with respect to FIGS. 1-10 may be used to facilitate three-dimensional labelling using frame of reference projections according to some embodiments of the inventive concept described herein. These apparatus may be embodied as one or more enterprise, application, personal, pervasive and/or embedded computer systems and/or apparatus that are operable to receive, transmit, process and store data using any suitable combination of software, firmware and/or hardware and that may be standalone or interconnected by any public and/or private, real and/or virtual, wired and/or wireless network including all or a portion of the global communication network known as the Internet, and may include various types of tangible, non-transitory computer readable media. In particular, the memory 905 and the memory 1005 when coupled to a processor includes computer readable program code that, when executed by the processor, causes the processor to perform operations including one or more of the operations described herein with respect to FIGS. 1-7.

Some embodiments of the inventive concept may provide an AI system in which image data may be labeled more efficiently by reducing the amount of manual labeling involved in images that may be associated with the same subject or object. A three-dimensional volume may be defined that encompasses images of the subject or object from multiple perspectives and the three-dimensional volume may be assigned a label. Many of the two-dimensional images to be labeled, however, may be cross-sectional slices and/or different perspective views of the subject or object encompassed in the three-dimensional volume. The three-dimensional volume can be projected onto the various images to be labeled and, based on the amount of surface area of the image that falls inside the three-dimensional volume relative to the total surface area of the image, the image may be automatically labeled with the same label assigned to the three-dimensional volume without the need for manual intervention. The threshold for how much of an images surface area needs to fall within the three-dimensional volume for the image to qualify for automatic labeling using the three-dimensional volume can be adjusted based on accuracy/error rates, the types of subject or objects being labeled, or other factors.

Further Definitions and Embodiments

In the above description of various embodiments of the present inventive concept, it is to be understood that the terminology used herein is for the purpose of describing particular embodiments only and is not intended to be limiting of the invention. Unless otherwise defined, all terms (including technical and scientific terms) used herein have the same meaning as commonly understood by one of ordinary skill in the art to which this inventive concept belongs. It will be further understood that terms, such as those defined in commonly used dictionaries, should be interpreted as having a meaning that is consistent with their meaning in the context of this specification and the relevant art and will not be interpreted in an idealized or overly formal sense expressly so defined herein.

The flowchart and block diagrams in the figures illustrate the architecture, functionality, and operation of possible implementations of systems, methods, and computer program products according to various aspects of the present inventive concept. In this regard, each block in the flowchart or block diagrams may represent a module, segment, or portion of code, which comprises one or more executable instructions for implementing the specified logical function (s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The terminology used herein is for the purpose of describing particular aspects only and is not intended to be limiting of the inventive concept. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items. Like reference numbers signify like elements throughout the description of the figures.

In the above-description of various embodiments of the present inventive concept, aspects of the present inventive concept may be illustrated and described herein in any of a number of patentable classes or contexts including any new and useful process, machine, manufacture, or composition of matter, or any new and useful improvement thereof. Accordingly, aspects of the present inventive concept may be implemented entirely hardware, entirely software (including firmware, resident software, micro-code, etc.) or combining software and hardware implementation that may all generally be referred to herein as a "circuit," "module," "component," or "system." Furthermore, aspects of the present inventive concept may take the form of a computer program product comprising one or more computer readable media having computer readable program code embodied thereon.

Any combination of one or more computer readable media may be used. The computer readable media may be a computer readable signal medium or a computer readable storage medium. A computer readable storage medium may be, for example, but not limited to, an electronic, magnetic, optical, electromagnetic, or semiconductor system, apparatus, or device, or any suitable combination of the foregoing. More specific examples (a non-exhaustive list) of the computer readable storage medium would include the following: a portable computer diskette, a hard disk, a random access memory (RAM), a read-only memory (ROM), an erasable programmable read-only memory (EPROM or Flash memory), an appropriate optical fiber with a repeater, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

The description of the present inventive concept has been presented for purposes of illustration and description, but is not intended to be exhaustive or limited to the inventive concept in the form disclosed. Many modifications and variations will be apparent to those of ordinary skill in the art without departing from the scope and spirit of the inventive concept. The aspects of the inventive concept herein were chosen and described to best explain the principles of the inventive concept and the practical application, and to enable others of ordinary skill in the art to understand the inventive concept with various modifications as are suited to the particular use contemplated.

What is claimed is:

1. A computer-implemented method, comprising:
receiving, by one or more processors, a plurality of images;
receiving, by the one or more processors, a definition of a three-dimensional volume in a same frame of reference as the plurality of images, wherein the three-dimensional volume is defined based on an intersection of a first two-dimensional bounding box in the same frame of reference and a second two-dimensional bounding box in the same frame of reference;
receiving, by the one or more processors, a label for the three-dimensional volume;
projecting, by the one or more processors, the three-dimensional volume onto each image of the plurality of images;
determining, by the one or more processors and for each image of the plurality of images, an image metric based on the projecting of the three-dimensional volume onto the image, the image metric including, for an image surface area metric defined by a ratio of a first amount of surface area of the image that is contained within the three-dimensional volume to a second amount of surface area of the image that is contained outside of the three-dimensional volume; and
labeling, by the one or more processors and for each image of the plurality of images, the image with the label for the three-dimensional volume when the image metric for the image satisfies an image surface area metric threshold.

2. The computer-implemented method of claim 1, wherein the image surface area metric threshold comprises a surface area percentage threshold.

3. The computer-implemented method of claim 1, further comprising:
training, by the one or more processors, a machine learning engine using images, of the plurality of images, that have been labeled with the label for the three-dimensional volume.

4. The computer-implemented method of claim 3, further comprising:
generating, by the one or more processors, an artificial intelligence engine based on the machine learning engine that has been trained.

5. The computer-implemented method of claim 1, wherein the plurality of images is associated with a regulatory constraint of a governmental administrative authority.

6. The computer-implemented method of claim 5, wherein:
the plurality of images comprises Protected Health Information (PHI); and
the regulatory constraint comprises a Health Insurance Portability and Accountability Act (HIPAA) constraint.

7. A system, comprising:
one or more processors; and
at least one memory storing processor-executable instructions that, when executed by the one or more processors, cause the one or more processors to perform operations comprising:
receiving a plurality of images;
receiving a definition of a three-dimensional volume in a same frame of reference as the plurality of images, wherein the three-dimensional volume is defined based on an intersection of a first two-dimensional bounding box in the same frame of reference and a second two-dimensional bounding box in the same frame of reference;
receiving a label for the three-dimensional volume;
projecting, by the one or more processors, the three-dimensional volume onto each image of the plurality of images;
determining, for each image of the plurality of images, an image metric based on the projecting of the three-dimensional volume onto the image, the image metric including an image surface area metric defined by a ratio of a first amount of surface area of the image that is contained within the three-dimensional volume to a second amount of surface area of the image that is contained outside of the three-dimensional volume; and
labeling, for each image of the plurality of images, the image with the label for the three-dimensional volume when the image metric for the image satisfies an image surface area metric threshold.

8. The system of claim 7, wherein the image surface area metric threshold comprises a surface area percentage threshold.

9. The system of claim 7, wherein the operations further comprise:
training a machine learning engine using images, of the plurality of images, that have been labeled with the label for the three-dimensional volume.

10. The system of claim 9, wherein the operations further comprise:
generating an artificial intelligence engine based on the machine learning engine that has been trained.

11. The system of claim 7, wherein the plurality of images is associated with a regulatory constraint of a governmental administrative authority.

12. The system of claim 11, wherein:
the plurality of images comprises Protected Health Information (PHI); and
the regulatory constraint comprises a Health Insurance Portability and Accountability Act (HIPAA) constraint.

13. One or more non-transitory computer-readable media storing processor-executable instructions that, when executed by one or more processors, cause the one or more processors to perform operations comprising:
receiving, a plurality of images;
receiving, a definition of a three-dimensional volume in a same frame of reference as the plurality of images, wherein the three-dimensional volume is defined based on an intersection of a first two-dimensional bounding box in the same frame of reference and a second two-dimensional bounding box in the same frame of reference;
receiving a label for the three-dimensional volume;
projecting the three-dimensional volume onto each image of the plurality of images;
determining, for each image of the plurality of images, an image metric based on the projecting of the three-dimensional volume onto the image, the image metric including an image surface area metric defined by a ratio of a first amount of surface area of the image that is contained within the three-dimensional volume to a second amount of surface area of the image that is contained outside of the three-dimensional volume; and
labeling, for each image of the plurality of images, the image with the label for the three-dimensional volume when the image metric for the image satisfies an image surface area metric threshold.

14. The one or more non-transitory computer-readable media of claim 13, wherein the image surface area metric threshold comprises a surface area percentage threshold.

15. The one or more non-transitory computer-readable media of claim 13, wherein the operations further comprise:
training a machine learning engine using images, of the plurality of images, that have been labeled with the label for the three-dimensional volume.

16. The one or more non-transitory computer-readable media of claim 15, wherein the operations further comprise:
generating an artificial intelligence engine based on the machine learning engine that has been trained.

17. The one or more non-transitory computer-readable media of claim 13, wherein the plurality of images is associated with a regulatory constraint of a governmental administrative authority.

18. The one or more non-transitory computer-readable media of claim 13, wherein:
the plurality of images comprises Protected Health Information (PHI); and
the regulatory constraint comprises a Health Insurance Portability and Accountability Act (HIPAA) constraint.

\* \* \* \* \*